(12) United States Patent
Wright et al.

(10) Patent No.: US 8,600,407 B2
(45) Date of Patent: Dec. 3, 2013

(54) METHOD AND APPARATUS FOR IDENTIFYING BLUETOOTH CONNECTION BETWEEN CRADLE AND HANDHELD DATA CAPTURE DEVICE

(75) Inventors: Mariya Wright, Cortlandt Manor, NY (US); Robert J. Pang, Williston Park, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 615 days.

(21) Appl. No.: 12/886,882

(22) Filed: Sep. 21, 2010

(65) Prior Publication Data

US 2012/0071093 A1    Mar. 22, 2012

(51) Int. Cl.
 *H04W 24/00* (2009.01)
(52) U.S. Cl.
 USPC .............. 455/456.2; 455/456.1; 455/456.3; 455/41.1; 455/41.2; 455/556.1; 455/566; 340/539.1; 340/539.11; 340/539.13; 340/572.1

(58) Field of Classification Search
 USPC ................ 455/41.1, 41.2, 456.1–456.6, 457, 455/68–70, 556.1–556.2, 557, 566, 567; 340/539.1, 539.11, 539.13, 572.1, 10.1
 See application file for complete search history.

(56) References Cited

U.S. PATENT DOCUMENTS

| | | | |
|---|---|---|---|
| 4,794,239 A | 12/1988 | Allais | |
| 5,304,786 A | 4/1994 | Pavlidis et al. | |
| 7,686,225 B2 * | 3/2010 | Schmidt et al. | 235/462.46 |
| 7,912,503 B2 * | 3/2011 | Chang et al. | 455/557 |
| 8,363,098 B2 * | 1/2013 | Rosener et al. | 348/77 |
| 2011/0081860 A1 * | 4/2011 | Brown et al. | 455/41.3 |
| 2011/0084807 A1 * | 4/2011 | Logan et al. | 340/10.1 |

* cited by examiner

*Primary Examiner* — Tuan A Tran
(74) *Attorney, Agent, or Firm* — Nong-Qiang Fan

(57) ABSTRACT

A method and apparatus for identifying a Bluetooth connection between a cradle and at least one handheld data capture device that includes a barcode reading arrangement or an RFID reader. The apparatus includes a cradle configured to accommodate a handheld data capture device detachably settled therein. The apparatus also includes a connection indicator configured to be activated, in response to a find-connection command, if a Bluetooth connection between the cradle and the handheld data capture device is identified. In some implementations, the connection indicator is on the cradle and it can be a light emitting diode, a speaker, or a vibration generator.

11 Claims, 5 Drawing Sheets

METHOD AND APPARATUS FOR IDENTIFYING BLUETOOTH CONNECTION BETWEEN CRADLE AND HANDHELD DATA CAPTURE DEVICE

FIELD OF THE DISCLOSURE

The present disclosure relates generally to handheld data capture devices including handheld barcode readers or handheld RFID readers.

BACKGROUND

Various electro-optical systems have been developed for reading optical indicia, such as barcodes. A barcode is a coded pattern of graphical indicia comprised of a series of bars and spaces of varying widths. In a barcode, the bars and spaces having differing light reflecting characteristics. Some of the barcodes have a one-dimensional structure in which bars and spaces are spaced apart in one direction to form a row of patterns. Examples of one-dimensional barcodes include Uniform Product Code (UPC), which is typically used in retail store sales. Some of the barcodes have a two-dimensional structure in which multiple rows of bar and space patterns are vertically stacked to form a single barcode. Examples of two-dimensional barcodes include Code 49 and PDF417, which are respectively described in U.S. Pat. Nos. 4,794,239 and 5,304,786.

Systems that use one or more solid-state imagers for reading and decoding barcodes are typically referred to as imaging-based barcode readers, imaging scanners, or imaging readers. A solid-state imager generally includes a plurality of photosensitive elements or pixels aligned in one or more arrays. Examples of solid-state imagers include charged coupled devices (CCD) or complementary metal oxide semiconductor (CMOS) imaging chips.

FIG. 1A shows an imaging scanner 50 in accordance with some implementations. The imaging scanner 50 has a window 56 and a housing 58 with a handle. The imaging scanner 50 also has a base 52 for supporting itself on a countertop. The imaging scanner 50 can be used in a hands-free mode as a stationary workstation when it is placed on the countertop. The imaging scanner 50 can also be used in a handheld mode when it is picked up off the countertop and held in an operator's hand. In the hands-free mode, products can be slid, swiped past, or presented to the window 56. In the handheld mode, the imaging scanner 50 can be moved towards a barcode on a product, and a trigger 54 can be manually depressed to initiate imaging of the barcode. In some implementations, the base 52 can be omitted, and the housing 58 can also be in other shapes.

In FIG. 1A, a cable 59 is also connected to the base 52. The cable 59 can be implemented to provide the power to the imaging scanner 50. In other implementations, as shown in FIG. 1B, the imaging scanner 50 can be detachably placed in a cradle 100. When the imaging scanner 50 detachably settled in the cradle 100, the imaging scanner 50 can be charged with a cable 59 connected to the cradle 100. When the imaging scanner 50 is removed from the cradle 100, it functions a cordless handheld device that can be freely move around. In addition, the imaging scanner 50 generally can communicate with the cradle 100 through certain wireless connections, such as a Bluetooth connection. Quite often, in a warehouse or in a retail environment there are large numbers of cordless scanners and cradles. Since there are no wires, it is nearly impossible to tell which cradle the scanner is connected to or which scanners are connected to the base by observation only.

In one example as shown in FIG. 2, any of the four imaging scanners 50A, 50B, 50C, and 50D can be connected with the cradle 100, which is associated with a Point of Sale (POS) 200. One of the current methods to determine the connection is by scanning a barcode with an imaging scanner, and listening for the error beeps or to see which POS the data comes out. This method is not very convenient. Further more, this method can become even more difficult if more then one cradle is connected to a PC and all imaging scanners belong to a particular cradle need to be located, because up to seven imaging scanners can belong to one cradle under Bluetooth standard. Therefore, it may be desirable to find a better method for identifying a Bluetooth connection between a cradle and one or more handheld data capture devices, such as handheld imaging scanners.

SUMMARY

In one aspect, the invention is directed to a method of identifying a Bluetooth connection. The method includes initiating a find-connection command from a handheld data capture device. The handheld data capture device includes a barcode reading arrangement or an RFID reader. The method also includes activating a connection indicator, in response to the find-connection command, on a cradle that is identified to have a Bluetooth connection with the handheld data capture device.

In another aspect, the invention is directed to a method of identifying a Bluetooth connection between a cradle and at least one handheld data capture device. Each of the at least one handheld data capture device includes a barcode reading arrangement or an RFID reader. The method includes initiating a find-connection command from the cradle. The method also includes activating a connection indicator, in response to the find-connection command, on each of the at least one handheld data capture device that is identified to have a Bluetooth connection with the cradle.

In another aspect, the invention is directed to an apparatus. The apparatus includes a cradle configured to accommodate a handheld data capture device detachably settled therein. The handheld data capture device includes a barcode reading arrangement or an RFID reader. The apparatus also includes a connection indicator configured to be activated, in response to a find-connection command, if a Bluetooth connection between the cradle and the handheld data capture device is identified. In some implementations, the connection indicator is on the cradle, and the connection indicator can be a light emitting diode, a speaker, or a vibration generator.

Implementations of the invention can include one or more of the following advantages. Even if there are large numbers of cordless scanners and cradles that are present in a working environment, the Bluetooth pairing relationships between each cradle and each handheld data capture device can still be identified conveniently. These and other advantages of the present invention will become apparent to those skilled in the art upon a reading of the following specification of the invention and a study of the several figures of the drawings.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
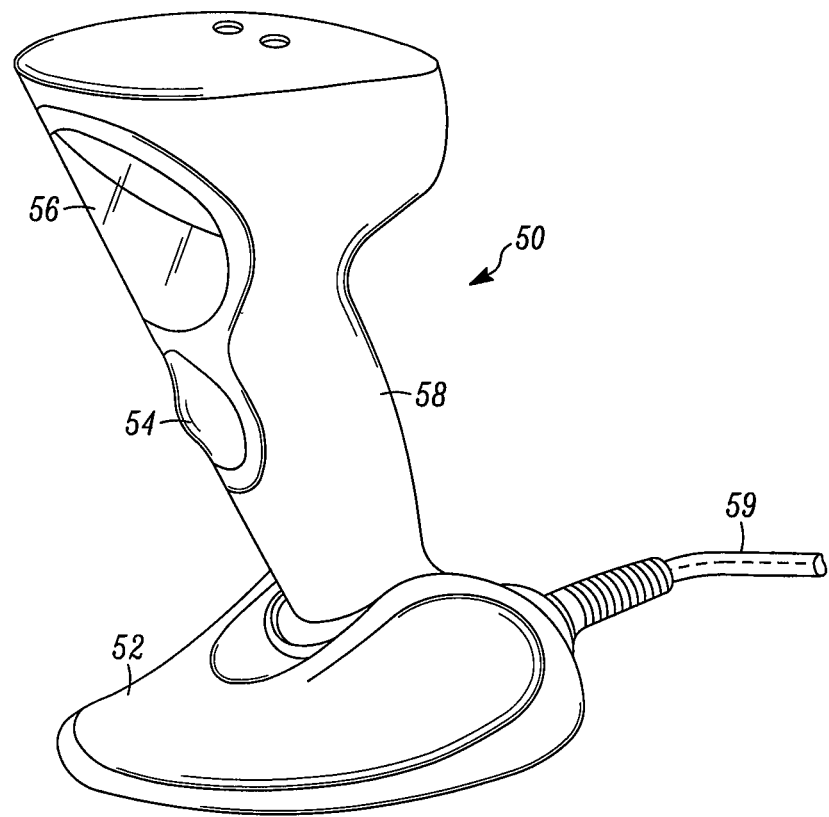
FIG. 1A shows an imaging scanner in accordance with some embodiments.
Figure 1B:
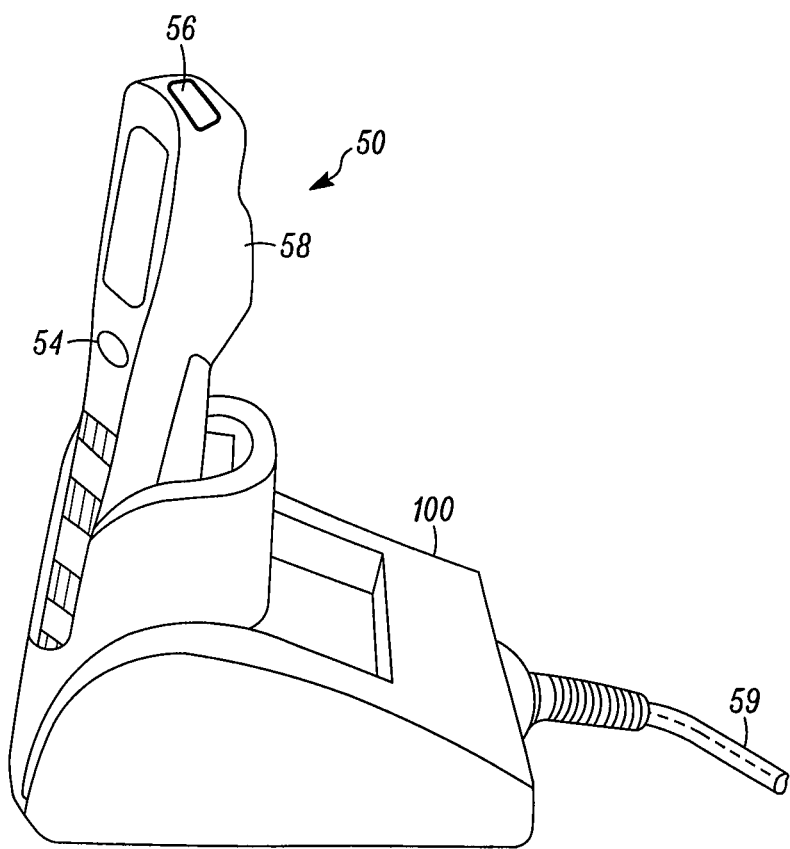
FIG. 1B shows an imaging scanner that is detachably placed in a cradle in accordance with some embodiments.
Figure 2:
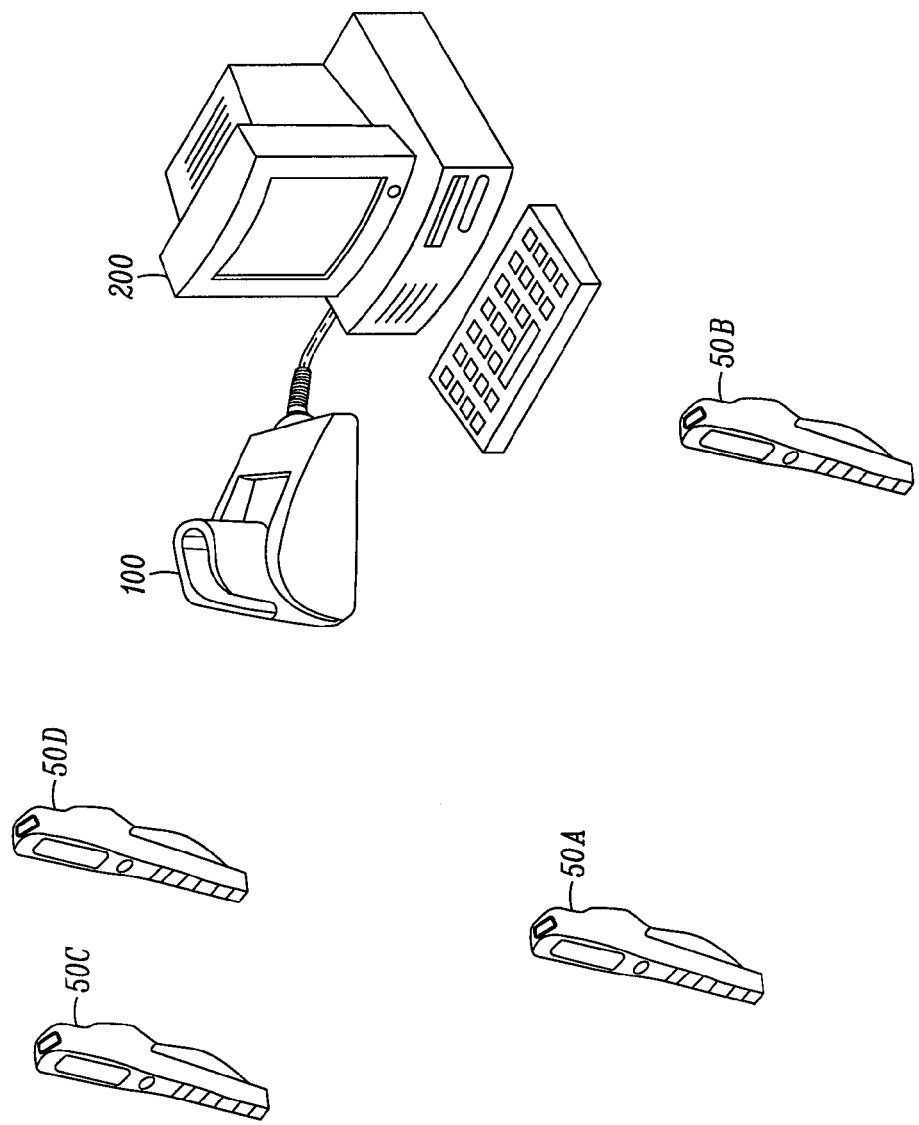
FIG. 2 shows that any of the multiple imaging scanners can be connected with the cradle in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Figure 3:
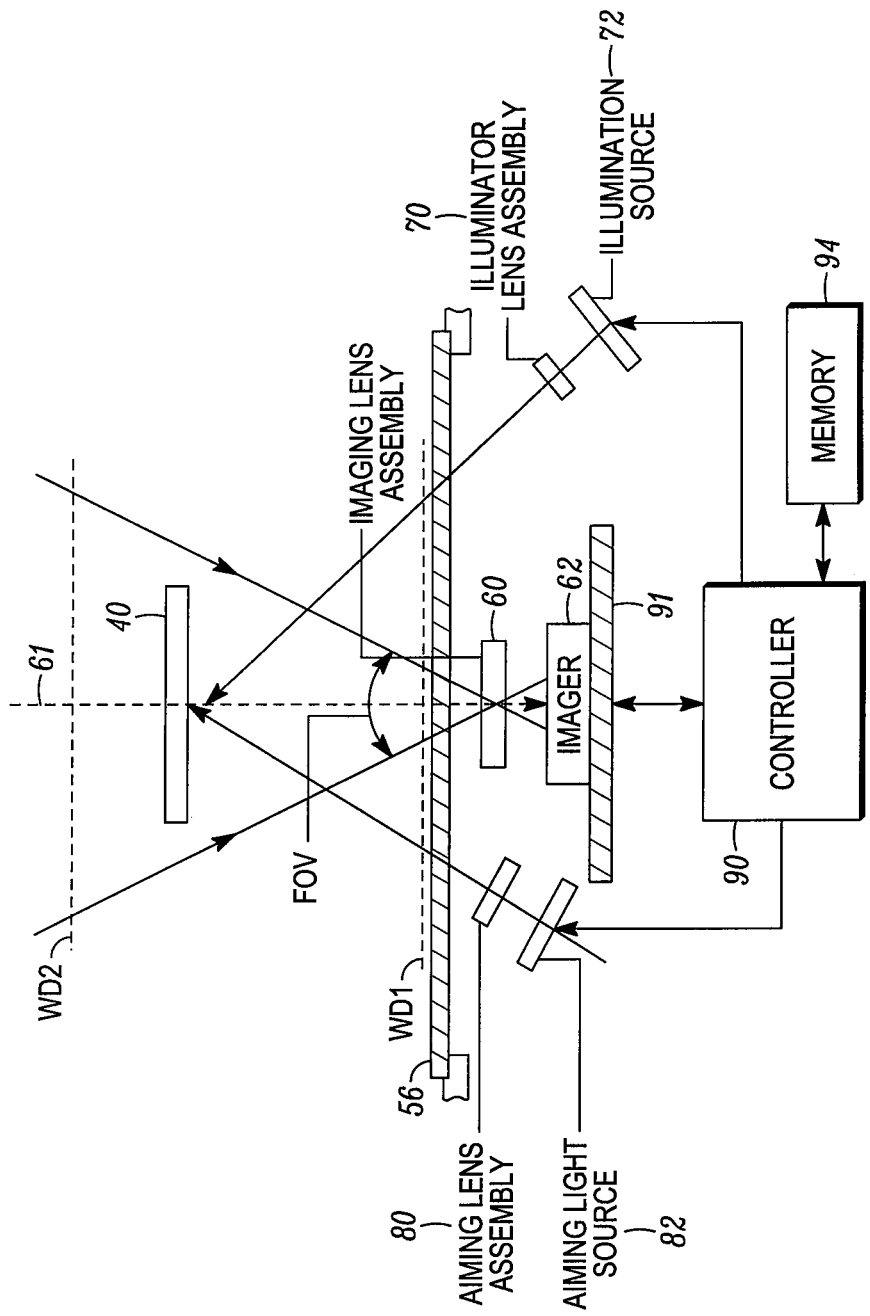
FIG. 3 is a schematic of an imaging scanner in accordance with some embodiments.

FIG. 3 is a schematic of an imaging scanner 50 in accordance with some embodiments. The imaging scanner 50 in FIG. 3 includes the following components: (1) a solid-state imager 62 positioned behind an imaging lens assembly 60; (2) an illuminating lens assembly 70 positioned in front of an illumination source 72; (3) an aiming lens assembly 80 positioned in front of an aiming light source 82; and (4) a controller 90. In FIG. 3, the imaging lens assembly 60, the illuminating lens assembly 70, and the aiming lens assembly 80 are positioned behind the window 56. The solid-state imager 62 is mounted on a printed circuit board 91 in the imaging scanner.

The solid-state imager 62 can be a CCD or a CMOS imaging device. The solid-state imager 62 generally includes multiple pixel elements. These multiple pixel elements can be formed by a one-dimensional array of photosensitive elements arranged linearly in a single row. These multiple pixel elements can also be formed by a two-dimensional array of photosensitive elements arranged in mutually orthogonal rows and columns. The solid-state imager 62 is operative to detect light captured by an imaging lens assembly 60 along an optical path or axis 61 through the window 56. Generally, the solid-state imager 62 and the imaging lens assembly 60 are designed to operate together for capturing light scattered or reflected from a barcode 40 as pixel data over a two-dimensional field of view (FOV).

The barcode 40 generally can be located anywhere in a working range of distances between a close-in working distance (WD1) and a far-out working distance (WD2). In one specific implementation, WD1 is about a few inches from the window 56, and WD2 is about a few feet from the window 56. Some of the imaging scanners can include a range finding system for measuring the distance between the barcode 40 and the imaging lens assembly 60. Some of the imaging scanners can include an auto-focus system to enable a barcode be more clearly imaged with the solid-state imager 62 based on the measured distance of this barcode. In some implementations of the auto-focus system, the focus length of the imaging lens assembly 60 is adjusted based on the measured distance of the barcode. In some other implementations of the auto-focus system, the distance between the imaging lens assembly 60 and the solid-state imager 62 is adjusted based on the measured distance of the barcode.

In FIG. 3, the illuminating lens assembly 70 and the illumination source 72 are designed to operate together for generating an illuminating light towards the barcode 40 during an illumination time period. The illumination source 72 can include one or more light emitting diodes (LED). The illumination source 72 can also include a laser or other kind of light sources. The aiming lens assembly 80 and the aiming light source 82 are designed to operate together for generating a visible aiming light pattern towards the barcode 40. Such aiming pattern can be used by the operator to accurately aim the imaging scanner at the barcode. The aiming light source 82 can include one or more light emitting diodes (LED). The aiming light source 82 can also include a laser or other kind of light sources.

In FIG. 3, the controller 90, such as a microprocessor, is operatively connected to the solid-state imager 62, the illumination source 72, and the aiming light source 82 for controlling the operation of these components. The controller 90 can also be used to control other devices in the imaging scanner. The imaging scanner 50 includes a memory 94 that can be accessible by the controller 90 for storing and retrieving data. In many embodiments, the controller 90 also includes a decoder for decoding one or more barcodes that are within the field of view (FOV) of the imaging scanner 50. In some implementations, the barcode 40 can be decoded by digitally processing a captured image of the barcode with a microprocessor.

In operation, in accordance with some embodiments, the controller 90 sends a command signal to energize the illumination source 72 for a predetermined illumination time period. The controller 90 then exposes the solid-state imager 62 to capture an image of the barcode 40. The captured image of the barcode 40 is transferred to the controller 90 as pixel data. Such pixel data is digitally processed by the decoder in the controller 90 to decode the barcode. The information obtained from decoding the barcode 40 is then stored in the memory 94 or sent to other devices for further processing.

Figure 4:
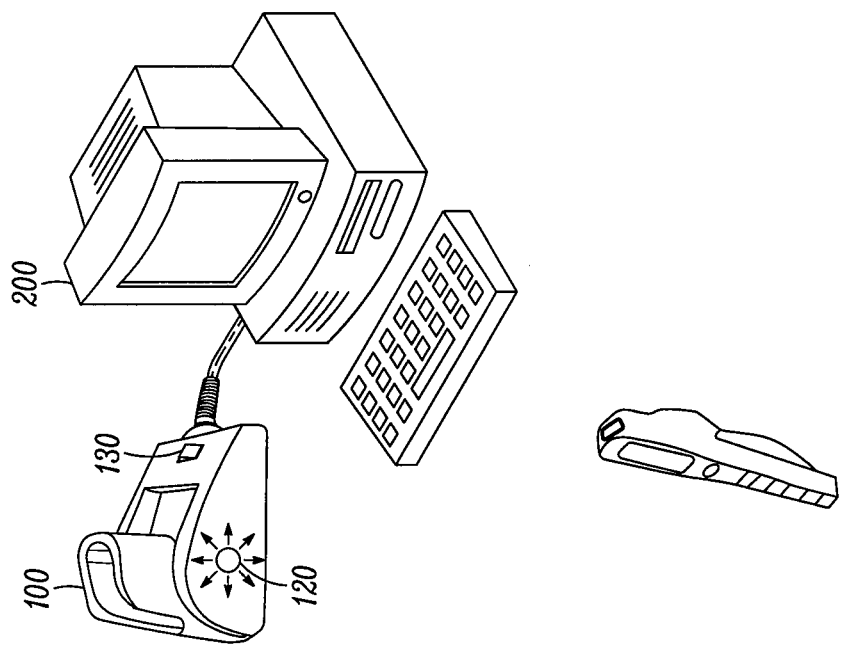
FIG. 4 shows multiple handheld data capture devices and a cradle associated with a POS in accordance with some embodiments.
Figure 4:
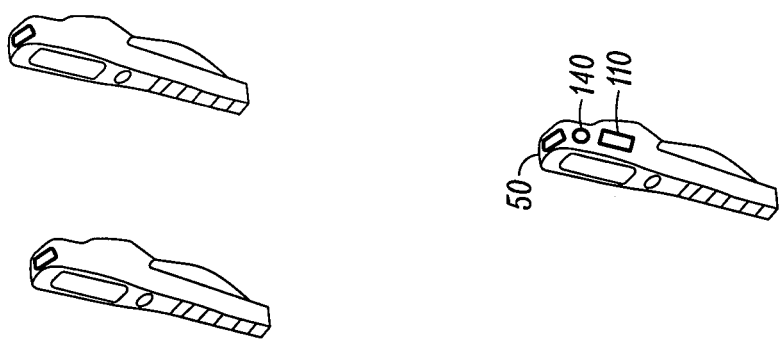

FIG. 4 shows multiple handheld data capture devices and a cradle 100 associated with a POS 200 in accordance with some embodiments. In FIG. 4, the cradle 100 is configured to accommodate a handheld data capture device 50 such that it can be detachably settled in. The handheld data capture device 50 can include a barcode reading arrangement or an RFID reader. In the implementation as shown in FIG. 4, the cradle 100 includes a connection indicator 120, and the handheld data capture device 50 includes a button 110 operative to initiating a find-connection command. In operation, if there is no Bluetooth connection between the cradle 100 and the handheld data capture device 50 that can be identified, pressing the button 110 on the handheld data capture device 50 will not cause activation action of the connection indicator 120.

In operation, if there is a Bluetooth connection between the cradle 100 and the handheld data capture device 50 that can be identified, pressing the button 110 on the handheld data capture device 50 will activate the connection indicator 120 on the cradle 100. In some exemplary implementations, if the connection indicator 120 is a light emitting diode, pressing the button 110 can cause some flashing from the light emitting diode; if the connection indicator 120 is a speaker, pressing the button 110 can cause one or more beeps from the speaker. In other exemplary implementations, pressing the button 110 can cause some vibration movement in the cradle 100.

In some implementations, the connection indicator 120 is placed on the cradle 100. In other implementations, the connection indicator 120 can be placed in other parts of the POS 200. For example, in some implementations, if there is a Bluetooth connection between the cradle 100 and the handheld data capture device 50 that can be identified, pressing the button 110 on the handheld data capture device 50 can cause one or more beeps from a personal computer that is connected to the cradle 100.

In some implementations, the find-connection command is initiated by pressing the button 110 on the handheld data capture device 50. In other implementations, the find-connection command can be initiated by acting on a menu item on a display for the handheld data capture device 50. In still other implementations, the find-connection command can be initiated by scanning a barcode with the handheld data capture device 50. In addition, the find-connection command can also be initiated from the handheld data capture device 50 automatically and periodically.

In some implementations as shown in FIG. 4, the handheld data capture device 50 can also include a connection indicator 140, and the cradle 100 can also include a button 130 operative to initiating a find-connection command. In operation, if there is a Bluetooth connection between the cradle 100 and the handheld data capture device 50 that can be identified, pressing the button 130 on the cradle 100 will activate the connection indicator 140 on the handheld data capture device 50. The connection indicator 140 can be a light emitting diode, a speaker, or a vibration generator. If there are multiple handheld data capture devices that can possibly have Bluetooth connections with the cradle 100, pressing the button 130 on the cradle 100 will activate the connection indicator 140 on each of the handheld data capture devices that has a Bluetooth connection with the cradle 100. Under the current Bluetooth standard, up to seven handheld data capture devices can possibly have Bluetooth connections with the cradle 100, and pressing the button 130 on the cradle 100 allows each of the Bluetooth-connected devices be identified. In some implementations, instead of pressing the button 130 on the cradle 100, the find-connection command can also be initiated by acting on a menu item on a display of a personal computer that is connected to the cradle 100. The find-connection command from the cradle 100 can also be initiated automatically and periodically.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising the steps of:

initiating a find-connection command from a handheld data capture device, wherein the handheld data capture device includes at least one of a barcode reading arrangement and an RFID reader; and activating a connection indicator, in response to the find-connection command, on a cradle only if a preexisting Bluetooth connection between the cradle and the handheld data capture device is identified.

2. The method of claim 1, wherein the activating step comprises:

flashing a light source on the cradle.

3. The method of claim 1, wherein the activating step comprises:

generating one or more beeps from the cradle.

4. The method of claim 1, wherein the activating step comprises:

causing the cradle to vibrate.

5. The method of claim 1, wherein the initiating step comprises:

initiating the find-connection command from the handheld data capture device automatically and periodically.

6. The method of claim 1, wherein the initiating step comprises:

initiating the find-connection command from the handheld data capture device manually.

7. The method of claim 1, wherein the initiating step comprises:

initiating the find-connection command upon scanning a barcode with the handheld data capture device.

8. An apparatus comprising:

a cradle configured to accommodate a handheld data capture device detachably settled therein, the handheld data capture device including at least one of a barcode reading arrangement and an RFID reader;

a connection indicator configured to be activated, in response to a find-connection command initiated from the handheld data capture device, only if a preexisting Bluetooth connection between the cradle and the handheld data capture device is identified; and wherein the connection indicator is on the cradle.

9. The apparatus of claim 8, wherein the handheld data capture device comprises:

means for initiating the find-connection command.

10. The apparatus of claim 8, wherein the handheld data capture device further comprises:

a button thereon operative to initiating the find-connection command.

11. The apparatus of claim 8, wherein the connection indicator on the cradle includes a light emitting diode.

* * * * *